Aug. 11, 1970  C. A. AVALLONE  3,523,669
HOLDING DEVICE FOR ATTACHMENT TO SLOTTED TRACK MEANS
Filed Nov. 8, 1968
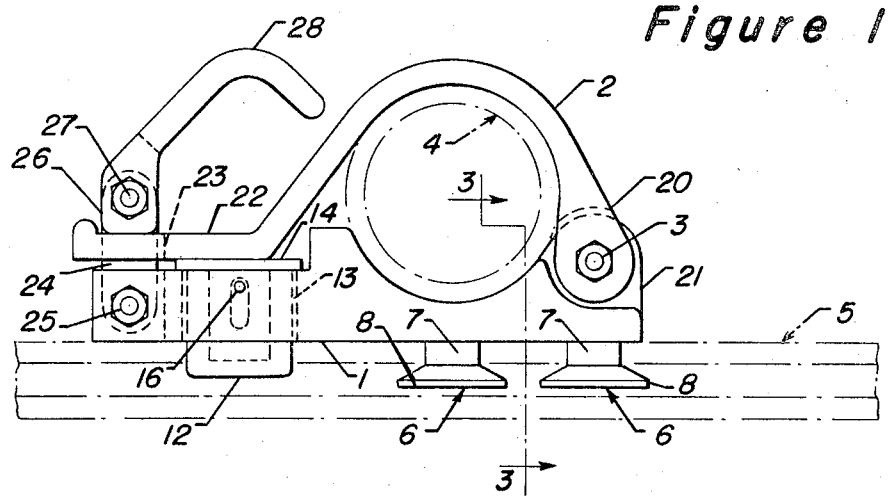
Figure 1
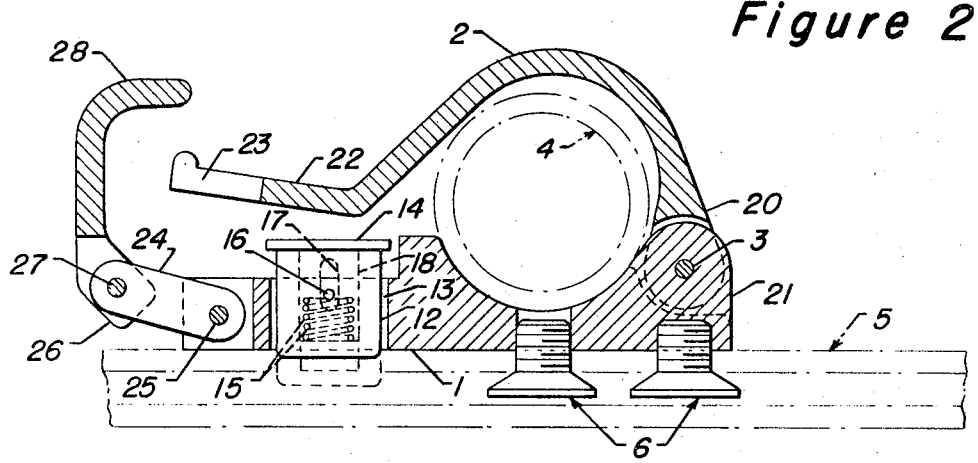
Figure 2
Figure 3
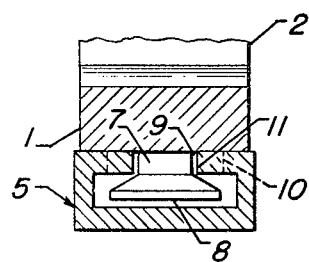
Figure 4
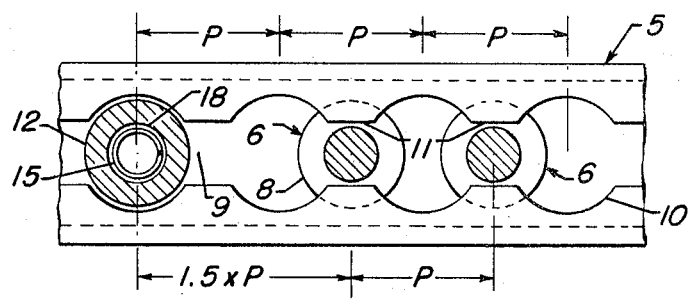
Figure 5
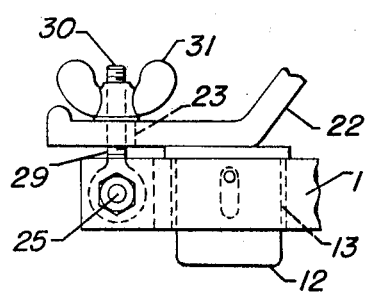
INVENTOR:
Carl A. Avallone
BY: James R. Hoatson, Jr.
Philip J. Liggett
ATTORNEYS

United States Patent Office 3,523,669
Patented Aug. 11, 1970

3,523,669
HOLDING DEVICE FOR ATTACHMENT TO SLOTTED TRACK MEANS
Carl A. Avallone, Litchfield, Conn., assignor to Universal Oil Products Company, Des Plaines, Ill., a corporation of Delaware
Filed Nov. 8, 1968, Ser. No. 774,345
Int. Cl. F16l 3/10
U.S. Cl. 248—73                                                7 Claims

ABSTRACT OF THE DISCLOSURE

A device for holding a seat member, or the like, to a slotted track means. The device utilizes separable upper and lower body sections adapted to be clamped over a bar or other member to be held to the track and at least one holding stud means extends from the lower body section in a manner to engage with and hold to the track means. A movable locking pin means also extendable from the device is provided to work in combination with the holding stud means to preclude detachment of the lower body section from the track.

---

The present invention relates to a clamping device for holding a bar member from a seat or other object to a slotted track. More particularly the invention is directed to an improved, easily attached, form of bar holding device which is adapted to join with and be fixedly held to a slotted track which has spaced openings to permit the insertion of one or more flanged holding studs.

It is recognized that there are many forms of clamping devices to hold one member to another and, further, that there are various known devices for effecting an attachment of an object to a track. For example, it is fairly common practice to have vehicle seats removably clamped to track means extending longitudinally along the floor of an airplane or other passenger vehicle. However, the present forms of track attachment means for seats are generally designed and constructed to be fixedly attached to a seat leg or, in effect, be a part of the seat structure itself. It appears that there has been no provision in connection with present constructions or designs for accommodating a track clamping means to varying spacings between tracks, where the tracks are part of a floor system embodying two or more parallel tracks along the length of the vehicle.

Thus it may be considered a principal object of this invention to provide a universal type of holding device or clamp which is adapted for attachment to slotted track means.

It may be considered a further object of the invention to provide a clamping device which may be readily attached, or detached, from the track without the need of any wrenches or special tools.

In a broad aspect, the present invention provides an improved clamping or holding device for effecting the attachment of a member to a slotted track having spaced openings for the insertion of holding means and for locking means, with such device comprising in combination, a lower body section having at least one flanged holding stud extending from the lower face thereof that is sized and adapted to be inserted into and slide along within slotted track means, said body section also having a liftable locking pin which passes through the base portion thereof and is sized to be dropped into a spaced opening therefor in said track means, said liftable pin being laterally positioned from said holding stud a distance which provides for the flange of the latter being held within a holding slot portion of the track means, an interior portion of said lower body section adapted to receive a bar member to be clamped and held tightly with respect to the track, an upper body section sized to connect to said lower body section and having an inner face portion adapted to oppose and unite with the latter section to encompass the bar member to be clamped, and clamping means connecting between said upper and lower body sections to hold them locked together over said bar member.

Various types of slotted track means may be provided for attaching seats or other members to a vehicle, container, or other area; however, the track means will generally be of an open channel nature with one or more openings which will permit the insertion of the holding pin or stud and a slot which will permit sliding the holding stud laterally such that a flange portion of the stud will be locked under encompassing lip or flange portions of the track. At the same time, the one or more openings permitting insertion of the holding stud into the track means, or other spaced openings, will provide for the insertion of one or more locking pin means into the track such that the holding stud will remain in a desired holding location, spaced away from an insertion opening. For example, one convenient form of track means which is available and frequently used in connection with aircraft floors for the holding of seats, cargo and the like, will have a longitudinal slot along the top portion thereof to provide an open interior channel and, at the same time, will have a spaced sequence of openings which will form a series of tooth-like flanges or a serrated edge along each side of the slot. As a result, there are spaced openings alternating with a series of narrowed sections as provided by the slot between protruding lips which will, in turn, serve to hold a flanged portion of a holding pin or stud from an externally mounted holding device.

In a preferred form of clamping device, as provided by the present invention, there will be one or more flanged pins or holding studs adapted to be inserted into one or more openings of the track means, such that as the device is then slid into an area to have the studs between openings, there are the opposing projecting lip sections to effect a holding of the device into the track means. As a means of having a separate locking pin member on the holding device, there will be a movable or retractable pin member which may be moved out of the way at such time as the holding stud is being inserted into the track means, but that will be releasable and adapted to fit into one of the openings in the track means as the holding device is moved into a desired fixed position. Thus, where the insertion openings are at uniformly spaced distances one from another, the positioning of the locking pin in the clamping device will be spaced from a holding stud a distance which includes a one-half space with respect to the spaced openings of the track means. Also, in a preferred construction using a retracable form of locking pin in the holding device, there will be a spring means to normally urge the locking pin in the direction which will maintain the pin in an opening of the slotted track means so that there will be no danger of the locking pin and the holding studs from being removed from the track during normal load conditions.

The present holding device need not be limited in size or be designed so as to limit its usage to merely clamping one particular size or form of bar member or any specific item inasmuch as it is contemplated within the scope of the present invention to have an upper portion of the present clamping device that is movable with respect to the lower portion thereof whereby it may at least encompass in part any desired form of member which is to be tightly clamped to a track means. Preferably, the body portions of the holding device will be held together by pin means, or other suitable linking mechanism, in order to provide a resulting hinged arrangement. Various forms of clamping means may be used to hold the two body portions together in a fixed, fully clamped position. In other words, a suitable cam lock means, wing-nut means, staple and hasp means, or the like, may be provided to effect a tight clamping between the two sections after encompassing the member to be held to the track means. Preferably, the arrangement will be such that no special tools are required to effect the tight clamping of one body portion to the other.

In a still further preferred design aspect of the present invention, there will be a provision for a portion of the upper hinged body section of the unit to effect a fixed holding of the locking pin in place while the device is in the clamped holding position. Such an arrangement may be in lieu of spring biasing means within the locking pin or, alternatively, the pin holding design may be in addition to spring biasing means for the pin in order to insure holding of the locking pin into an opening of the track means during such period of time as the device is in a fully clamped position and attached to the track means by the holding stud means.

Reference to the accompanying drawing and the following description thereof will serve to illustrate one embodiment of the present improved holding device for attaching a seat, bar or other member to a track means, as well as serve to point out additional advantageous features obtained in utilizing a clamping device of the present design in combination with conventional types of slotted track means.

DESCRIPTION OF THE DRAWING

FIG. 1 of the drawing is an elevational view indicating one embodiment of the present clamping device as being suitable for holding a round tubular-form member at substantially right angles to a track means.

FIG. 2 shows, in a longitudinal sectional elevational view, the same clamping means of FIG. 1, except that it shown in a partially opened position in order to better illustrate the method of clamping one body portion to another.

FIG. 3 is a partial sectional view indicating the positioning of a flanged holding stud within the interior of a slotted track.

FIG. 4 shows in a sectional plan view of the device and in a plan view of the track the spacing relationship of the holding stud means with respect to the locking pin means of the device and with respect to spaced openings in the track means.

FIG. 5 indicates, in a partial elevational view, an alternate clamping means for use between the upper and lower body sections of the holding device.

Referring now particularly to FIGS. 1 and 2 of the drawing there is shown a holding device having a lower body section 1 and an upper body section 2 which are hingedly connected to each other by pin means 3 at one end of the unit. The two sections are adapted to encompass and close around a tube section 4 which, in this instance, is indicated to be of a round tubular form. However, as hereinbefore pointed out, it is not intended to limit the present improved holding and clamping device to the holding of only round tubular members inasmuch as the sections 1 and 2 may well be designed to conform to a square, hexagon, or other form of tubular member, in which case the interior portions of the body sections 1 and 2 will have configurations to suit the particular member to be held to the track means.

The lower body section 1 will generally have a flat lower surface adapted to rest on the upper surface of the track means 5 (being shown by the dashed lines) and will have one or more downwardly projecting holding means 6. The flanged studs shown have a shank portion 7 sized to fit within an upper longitudinal slot of track means 5, while enlarged flange sections 8 will serve to engage against the underside portions of the flanges or lips extending along each side of the slot on the top portion of the track means 5. In other words, as best shown in FIG. 3 of the drawing, the track section 5 will have a continuous slot portion 9 and spaced openings 10 to in turn provide alternating spaced projecting lips or toothlike portion 11 that will serve to hold the flange portions 8 of each stud means 6. In order that the holding studs 6 may be inserted into the track means 5 it is, of course, required that the width or diameter of the flange portions 8 be slightly less than the diameter of the opening means 10 whereby there may be an insertion of the latter into the internal open portion of the track means 5. At the same time, there is the requirement that the diameter of the shank portion 7 be of a slightly less width than the slot means 9 in the track 5 such that after the holding device is inserted into the track it slid longitudinally to a positioning where the flanges 8 will be under the projecting portions 11.

Also extending from the lower body portion 1 there will be a locking pin member 12, which is movable upwardly and downwardly through an opening 13 and is adapted to fit into an opening 10 of track means 5. The locking pin member 12 is provided with a top flange portion 14 so as to provide a finger hold or other lifting means to effect the raising thereof during the time that the device is being inserted into the track means, as best shown by FIG. 2 of the drawing. In the latter figure, it will also be noted that a preferred embodiment of the locking pin member 12 will have an internal cavity or opening 18 which will accommodate the insertion of a spring member such as compression spring 15 which will, in turn, provide a biasing effect to normally urge the locking pin 12 downwardly from the body section 1. In this instance, there is indicated a pin 16 which extends through the body section 1 and through slotted openings 17 in each side of pin member 12 at a position to be above spring 15 so that the latter is held between the underside of pin 16 and the bottom of the cavity section 18.

It will be further noted, as best shown by FIG. 4 of the drawing, that the spacing of the locking pin member 12 from holding stud member 6 shall include a one-half space difference with respect to spacing P, which is the uniform spacing or "pitch" between openings 10 in the track means 5. The spacing between the two holding studs 6 is also the distance P so that at such time that the locking pin member 12 is within one of the openings 10 of track means 5, the holding stud means 6 will, in turn, be positioned one-half way between openings 10 and directly under opposing projecting lip means 11. During the period of inserting the holding device into track means 5, the retractable locking pin member 12 will be lifted, as shown in FIG. 2, so that the lower end of the pin is at least level with the underside of the lower body section 1 and will not lodge within any of the openings in the track means 5. Then, subsequent to the insertion of the holding studs 6 into the interior of the track means 5 and the slide movement of the device 6 into the positioning shown in FIG. 4, where the holding studs are under the projecting flange means 11, there may be a release of the locking pin 12 into an opening 10 of the track means. In order to insure a tight locking of the unit with the track means 5, the external diameter of the locking pin 12 shall be only slightly smaller than the internal diameter of an opening 10 so that there will be a slip fit into any one of the plurality of openings and the maintaining of the clamping device in a desired fixed position.

Subsequent to the insertion and locking of the lower body portion 1 of the clamping device into the track means 5, there will be an encompassing of the tubular member 4 with the top body section 1 and a subsequent clamping of the sections. In the present embodiment, a forked end portion 20 on body section 2 is adapted to encompass a central post section 21 and is attached to the latter by pin means 3. The opposing end of the upper body section 2 is, in the present embodiment, indicated as having a flat end portion 22 with a slot 23 that is, in turn, sized and adapted to receive a bar member 24 pivotally connected to the lower body section 1 by pin means 25. A suitable cam member 26 is pivotally connected to bar member 24 by a pin member 27 and a handle or grip section 28 opposite cam portion 26 permits a tight cam type of locking of the end section 22 with the lower body section 1. FIG. 2 of the drawing shows the bar member 24 and locking cam means 26 disengaged from the slot portion 23 in the end section 22 of upper body section 2 such that there may be engagement of the holding device with respect to the tubing 4. However, as best shown in FIG. 1 of the drawing, there is indicated the fully clamped or locked portion for the entire holding device over tube member 4, with bar member means 24 being pivoted vertically into position to extend through slot means 23 on end portion 22 and the subsequent turning of cam portion 26 with respect to bar 24 so that it exerts pressure downwardly on the top of end section 22 and clamps the entire upper body section 2 tightly to the lower body section 1. At such time as it is desired to effect an unclamping of the body sections, the lever arm 28 is pivoted outwardly around pin means 27 so as to release the cam action on the top of end portion 22 and the tension on bar member 24 and then the latter is rotated outwardly from slot means 23 so as to provide the positioning as shown in FIG. 2.

As in an alternative form of clamping, in lieu of the cam action of FIGS. 1 and 2, there may be used a typical eye-bolt and wing-nut arrangement such as shown in FIG. 5. In other words, a suitable eye-bolt means 29 is positioned around pin means 25 and has a shank portion 30 adapted to fit into the slot 23 of the end portion 22, while wing-nut 31 will provide means for effecting a threaded form of tight clamping of the upper body section 2 to the lower body section 1. Still other forms of clamping means may well be utilized and it is not intended to limit the present invention to any one form. However, preferably, the clamping will be done in a manner precluding the need of special wrenches or tools inasmuch as it is generally desired to effect the rapid attachment of members to the track means and eliminate unnecessary installation time, particularly where there may be a large number of clamping means used in any one vehicle or container.

In FIG. 2 of the drawing, it will be noted that each stud 6 is threadedly connected with the lower body section 1; however, again it is not intended to limit the invention to one type of connection or one shape of stud means for the lower body portion of the holding device. Actually, the stud means may be welded, cast integrally, or otherwise made a part of the main body section 1 and need not be threadedly connected therewith.

In still another modification, there may be suitable quick clamping means for both ends of the body section 2 with respect to the lower body section 1 and the elimination of the pin means 3 which is effecting the hinging of two sections in the embodiment shown. At the same time, it may be pointed out that various forms of hinged connections may be provided between the two body sections and the construction need not be limited to the specific forms of hinges or connections illustrated.

As a specific feature of the present embodiment, as best shown in both FIG. 1 and 2, it should be noted that at least a portion of the end section 22 on upper body protion 2 is adapted to come into contact with the top flange 14 of the locking pin member 12 such that the latter is held in place in a downwardly extended position during such time as the upper body section is being clamped to the lower body section. This arrangement insures the permanent locking of the pin member 12 into an opening of the track means 5 and if desired eliminate the spring biasing means 15 within the interior of pin 12. Of course, the spring biasing is of advantage in effecting an immediate blocking and holding of the lower body section in place on the track section 5 during such period of time as the upper body section is being clamped around the member to be held in place by the holding device.

It should again be pointed out that the holding member will be sized to suit the track means involved as well as the particular member to be held to the track means and will, of course, be of a suitably strong material able to provide for the holding of the tubular member 4 and such loadings as may be transferred into or by member 4. Generally the entire holding device will be of a metal, but where it is for holding small lightweight items, then such holding device may be made of a plastic, hard rubber, Bakelite, etc. which may be suitably cast, or otherwise formed and readily machined.

I claim as my invention:

1. A holding device for attachment to a slotted track having spaced openings for the insertion of holding means and for locking means, with said device comprising in combination, a lower body section having at least one flanged holding stud extending from the lower face thereof that is sized and adapted to be inserted into and slide along within slotted track means, said body section also having a liftable locking pin which passes through the base portion thereof and is sized to be dropped into a spaced opening therefor in said track means, said liftable pin being laterally positioned from said holding stud a distance which provides for the flange of the latter being held within a slot portion of the track means, an interior portion of said lower body section adapted to receive a bar member to be clamped and held tightly with respect to the track, an upper body section sized to connect to said lower body section and having an inner face portion adapted to oppose and unite with the latter section to encompass the bar member to be clamped, and clamping means connecting between said upper and lower body sections to hold them locked together over said bar member.

2. The holding device of claim 1 further characterized in that said locking pin shall be sized to be substantially equal to an opening in said track means that is provided for the insertion of the flange portion in said holding stud and said locking pin shall be spaced from the flanged holding stud a distance which includes a one-half space with respect to the spaces in the track means, whereby the locking pin will make use of the same opening means in the track means that is provided for the insertion of the flange portion of the flanged holding stud.

3. The holding device of claim 1 further characterized in that said upper body section has one end portion thereof hingedly connecting to said lower body section and an opposing end portion of the upper body section as well as the opposing portion of the lower body section provided with clamping means therebetween.

4. The holding device of claim 1 further characterized in that an upper portion of said locking pin extends through said lower body section and has a flanged portion thereon to permit the gripping and retracting of said locking pin upwardly through the lower body section whereby said locking pin is retracted while said holding stud means is being positioned in the track means.

5. The holding device of claim 4 further characterized in that said locking pin is provided with internal spring biasing means positioned to effect an urging of the locking pin downwardly from said lower body section.

6. The holding device of claim 4 further characterized in that a portion of the upper body section is positioned and adapted to rest over the top flange portion of said locking pin whereby to hold the latter in a fixed extended position when the body sections are in a clamped position.

7. The holding device of claim 1 further characterized in that pivoted bar means together with a cam end on a connecting locking bar providing for the clamping of one end portion of the upper body section to an end of the lower body section.

References Cited

UNITED STATES PATENTS

| | | | |
|---|---|---|---|
| 2,171,789 | 9/1939 | Lillick | 248—70 |
| 3,212,457 | 10/1965 | Looker | 248—361 X |
| 3,306,234 | 2/1967 | Hansen | 248—361 X |
| 3,344,749 | 10/1967 | Bass | 248—361 X |

CHANCELLOR E. HARRIS, Primary Examiner

U.S. Cl. X.R.

248—74, 361